United States Patent [19]
Matsumoto

[11] Patent Number: 4,724,544
[45] Date of Patent: Feb. 9, 1988

[54] METHOD OF PROCESSING IMAGE SIGNAL

[75] Inventor: Masayuki Matsumoto, Ashigara-Kami, Japan

[73] Assignee: Fuji Photo Film Co., Ltd., Kanagawa, Japan

[21] Appl. No.: 743,207

[22] Filed: Jun. 10, 1985

[30] Foreign Application Priority Data

Jun. 9, 1984 [JP] Japan .................. 59-118644
Jun. 9, 1984 [JP] Japan .................. 59-118645
Jun. 9, 1984 [JP] Japan .................. 59-118646
Jun. 9, 1984 [JP] Japan .................. 59-118647
Jun. 9, 1984 [JP] Japan .................. 59-118648

[51] Int. Cl.[4] ............................................. G06K 9/36
[52] U.S. Cl. ..................................... 382/27; 382/41; 382/54
[58] Field of Search ............... 382/41, 42, 27; 382/54

[56] References Cited

U.S. PATENT DOCUMENTS 4,398,256 8/1983 Nussmeier et al. ............... 382/54
4,464,788 8/1984 Sternberg et al. ............... 382/41
4,499,598 2/1985 Chittineni ......................... 382/54
4,506,382 3/1985 Hada et al. ....................... 382/54

FOREIGN PATENT DOCUMENTS 2057219 3/1981 United Kingdom .
2134352 8/1984 United Kingdom .
2151104 7/1985 United Kingdom .

Primary Examiner—Leo H. Boudreau
Attorney, Agent, or Firm—Sughrue, Mion, Zinn, Macpeak & Seas

[57] ABSTRACT

A method of processing image or picture signals, including the steps of setting an $n \times n$ picture element matrix window (where n is an odd number) with respect to an image signal obtained by scanning an original picture; calculating a correction amount for pixel information at a center position of the window by a predetermined formula obtained on the basis of all of the pixel information within the window; subtracting pixel information of respective picture elements in the window by a suitable subtrahend; calculating the correction amount from added values obtained by adding all the pixel information within the window; converting the correction amount into a correcting value by multiplying the correction amount by a correction coefficient which also takes into consideration the effect of the subtraction on the correction amount; and correcting the pixel information by using the correcting value.

13 Claims, 13 Drawing Figures

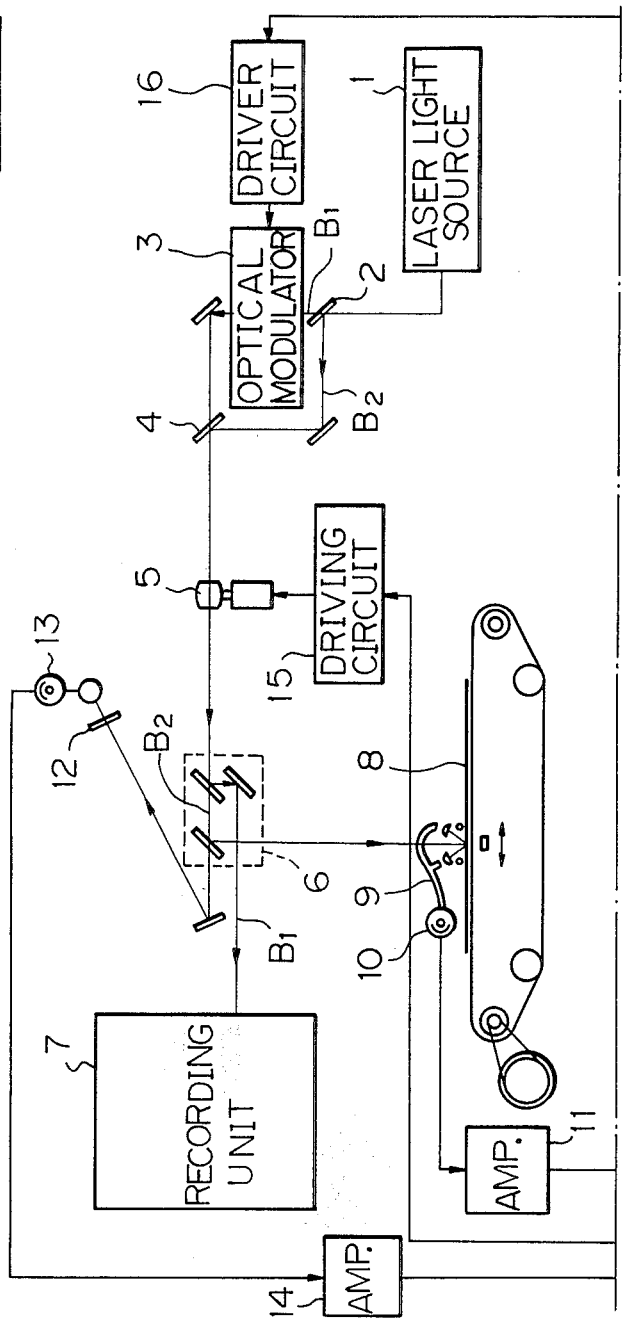

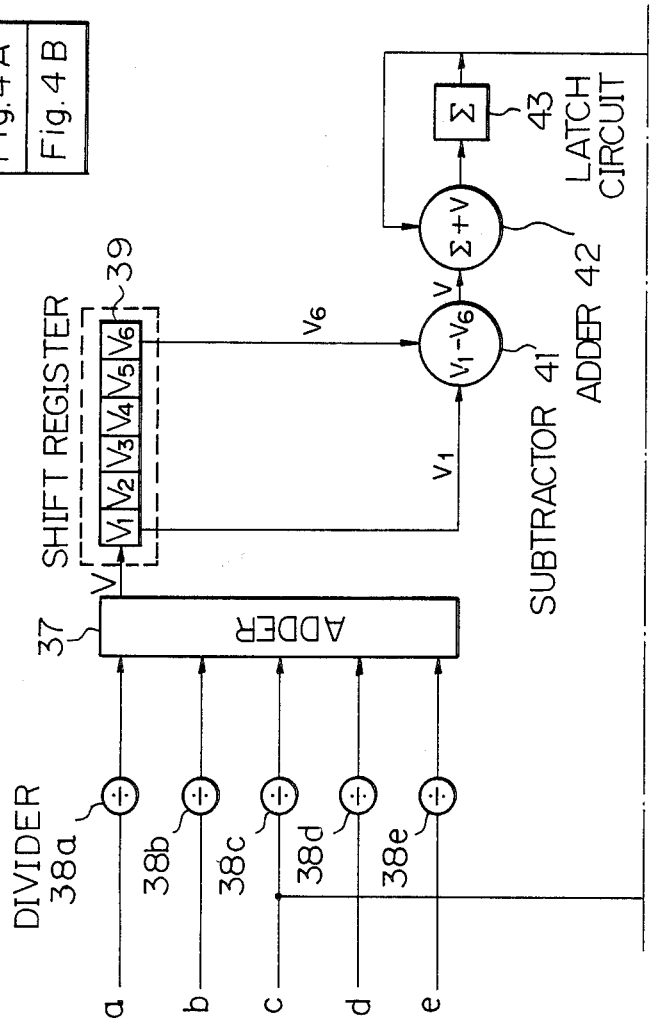

Fig. 5

| SHIFT REGISTER 39 | | | | | | LATCH CIRCUIT 43 | SHIFT REGISTER 45 | | | | | |
|---|---|---|---|---|---|---|---|---|---|---|---|---|
| $V_1$ | $V_2$ | $V_3$ | $V_4$ | $V_5$ | $V_6$ | | $M_1$ | $M_2$ | $M_3$ | $M_4$ | $M_5$ | $M_6$ |
| $V_1$ | | | | | | | $C_1$ | | | | | |
| $V_2$ | $V_1$ | | | | | $V_1$ | $C_2$ | $C_1$ | | | | |
| $V_3$ | $V_2$ | $V_1$ | | | | $V_1+V_2$ | $C_3$ | $C_2$ | $C_1$ | | | |
| $V_4$ | $V_3$ | $V_2$ | $V_1$ | | | $V_1+V_2+V_3$ | $C_4$ | $C_3$ | $C_2$ | $C_1$ | | |
| $V_5$ | $V_4$ | $V_3$ | $V_2$ | $V_1$ | | $V_1+V_2+V_3+V_4$ | $C_5$ | $C_4$ | $C_3$ | $C_2$ | $C_1$ | |
| $V_6$ | $V_5$ | $V_4$ | $V_3$ | $V_2$ | $V_1$ | $V_1+V_2+V_3+V_4+V_5$ | $C_6$ | $C_5$ | $C_4$ | $C_3$ | $C_2$ | $C_1$ |
| $V_7$ | $V_6$ | $V_5$ | $V_4$ | $V_3$ | $V_2$ | $V_2+V_3+V_4+V_5+V_6$ | $C_7$ | $C_6$ | $C_5$ | $C_4$ | $C_3$ | $C_2$ |
| $V_8$ | $V_7$ | $V_6$ | $V_5$ | $V_4$ | $V_3$ | $V_3+V_4+V_5+V_6+V_7$ | $C_8$ | $C_7$ | $C_6$ | $C_5$ | $C_4$ | $C_3$ |
| $V_9$ | $V_8$ | $V_7$ | $V_6$ | $V_5$ | $V_4$ | $V_4+V_5+V_6+V_7+V_8$ | $C_9$ | $C_8$ | $C_7$ | $C_6$ | $C_5$ | $C_4$ |

Fig. 6

| | | | | |
|---|---|---|---|---|
| $a_{11}$ | $a_{12}$ | $a_{13}$ | $a_{14}$ | $a_{15}$ |
| $a_{21}$ | $a_{22}$ | $a_{23}$ | $a_{24}$ | $a_{25}$ |
| $a_{31}$ | $a_{32}$ | $a_{33}$ | $a_{34}$ | $a_{35}$ |
| $a_{41}$ | $a_{42}$ | $a_{43}$ | $a_{44}$ | $a_{45}$ |
| $a_{51}$ | $a_{52}$ | $a_{53}$ | $a_{54}$ | $a_{55}$ |

Fig. 7
(A) 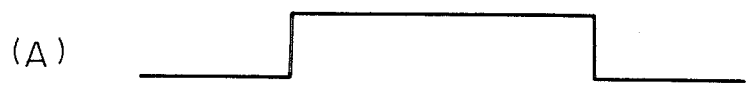
(B) 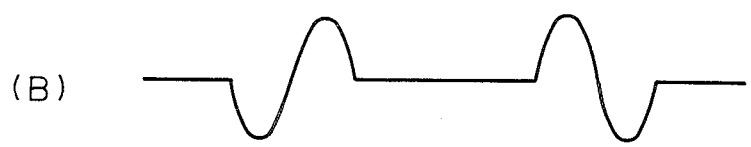
(C) 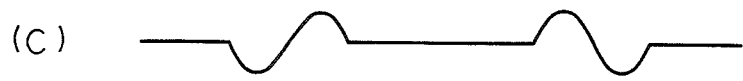
(D) 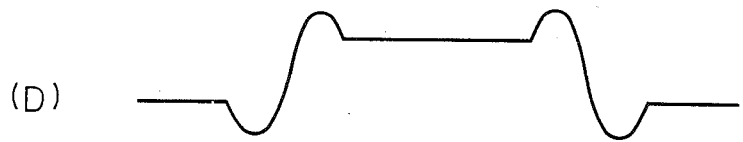
(E) 

METHOD OF PROCESSING IMAGE SIGNAL

BACKGROUND OF THE INVENTION

The present invention relates to a method of processing an image signal for processing an image by sharpening or smoothing a recorded image in a picture scanning and recording apparatus, such as a scanner, a facsimile apparatus, and the like.

In the first place, with reference to FIG. 1, an example of a picture scanning and recording apparatus, to which the present invention can be applied, is briefly explained.

FIG. 1 shows the construction of an apparatus for reading and recording an original. In FIG. 1, a recording and reading light source 1 (an Ar laser) emits randomly-polarized light beams. A light beam from the laser light source 1 is separated into a s-polarized recording light beam $B_1$ and a p-polarized reading light beam $B_2$ by a beam splitter 2. The recording beam $B_1$ is passed through an optical modulator 3, and thereafter is combined with the reading beam $B_2$ by a half-mirror 4. The combined beam is sent to a galvanometer-mirror 5 which is part of a scanning optical system, and is converted into one-dimensional scanning light by the galvanometer-mirror. A subsequent light splitting system 6 once again splits the incident light into a recording beam $B_1$ and a reading beam $B_2$. The recording beam $B_1$ is sent to a recording unit 7 to record on a recording member therein.

The reading beam $B_2$, on the other hand, is directed to a manuscript 8 for scanning the surface of the manuscript 8. This scanning direction is a main scanning direction.

The manuscript 8 is conveyed in the direction shown by an arrow perpendicular to the scanning direction by a suitable means. This conveying direction of the manuscript 8 is a sub-scanning direction.

Therefore, the scanning beam scans the original picture two-dimensionally in the main and sub-scanning directions. By this scanning, an image signal is obtained by a light receiving system including an optical fiber 9 and a photoelectric conversion element 10 arranged to receive reflected light or transmitted light, and the thus obtained image signal is amplified by an amplifier 11 and supplied to a control circuit 20.

At the light splitting system 6, a part of the reading beam $B_2$ is taken out and sent to a grating member 12. The light passing through the member 12 is converted into an electric signal by a photoelectric converter 13. The electric signal is further amplified by an amplifier 14, so as to take out a grating signal synchronized with manuscript scanning, and the grating signal is supplied to an I/O interface 21 provided in the control circuit 20.

The I/O interface 21 generates clock signals based on the grating signal, supplies the clock signals to a driving circuit 15 of the galvanometer-mirror 5, and supplies them to a first signal processing circuit 22, a line memory unit 23, a second signal processing circuit 24, and a dot image forming device 25 which are provided within the control circuit 20. In addition, the interface 21 and these circuits 22-25 are connected to a central processing unit 27 through a bus 26, so that each kind of control is carried out by an instruction from the central processing unit 27.

The image signal supplied to the control circuit 20 is A/D converted, gradation converted and shading corrected at the first signal processing circuit 22, and thereafter stored in the line memory unit 23. An image signal read-out from the line memory unit 23 is supplied to the second signal processing circuit 24, in which image sharpness is corrected by using a method which will be described later. The output of the signal processing circuit 24 is supplied to the dot image forming device 25 to form a dot image signal. This dot image signal is supplied to a driver circuit 16 for the optical modulator 3. In response to the dot image signal, a modulated signal is supplied to the optical modulator 3 from the optical modulator driver circuit 16 so as to modulate the recording beam $B_1$ supplied from the laser light source 1. Consequently, image information having corrected sharpness is recorded in the recording member in the recording unit 7.

A method of processing sharpness performed in such an image scanning and recording apparatus is carried out by the line memory unit 23 and the second signal processing circuit 24. There is set within the line memory unit 23 a predetermined n row and n column portion of an image matrix (hereinafter referred to as "window") as a subject to be processed with respect to two-dimensionally aligned image signals. A correction amount S to the image information at the central position within the window is for example calculated by the following equation:

$$S = n^2 a_{mm} - (a_{11} + a_{12} \ldots + a_{1n} + a_{21} + \ldots + a_{nn}) \quad (1)$$

where
$m = (n+1)/2$
$a_{mm}$ = pixel information at the central picture element
$a_{11} - a_{nn}$ = pixel information of each picture element within the window Based on this calculation, all of the image information $a_{11}$-$a_{nn}$ of the n×n picture elements within the window are recorded in the line memories of the line memory unit 23. The image information is successively read out, and the term $(a_{11} + a_{12} + \ldots + a_{1n} + a_{21} + \ldots + a_{nn})$ of equation (1) is calculated first. Then, the correction amount S is obtained by computer processing on the basis of equation (1), and the central picture signal of the original picture is corrected by the correction amount S.

However, as is well-known, since the image signal obtained by two-dimensionally scanning the manuscript 8 is arranged in time series, the above conventional method cannot be used to calculate the term $(a_{11} + a_{12} + \ldots + a_{1n} + a_{21} + \ldots + a_{nn})$ until the pixel information for all lines in the determined window have been successively written in each line memory portion corresponding thereto. It is further impossible for the pixel information to be simultaneously written into and read out from the line memory, so that the method of carrying out an arithmetic process in accordance with equation (1) is performed after pixel information of all pictures elements in the window are written in the line memories as in the above-described conventional method. As a result, the arithmetic process requires a long time, so that it is impossible to achieve a high speed image process. Moreover, noise contained in the image signal used for the operation in equation (1) or errors at the time of A/D conversion cause an error in the processed image signal which is finally obtained so that the desired image signal process cannot be attained.

SUMMARY OF THE INVENTION

It is an object of the present invention to overcome the above-described disadvantages of the conventional image signal processing method.

It is another object of the present invention to provide a method of processing image signals in which the effect of noise contained in the image signal and caused during A/D conversion on the finally processed image signal can be suppressed.

It is a further object of the present invention to provide a method of processing image signals in which the image signals can be processed with higher speed than in the conventional process.

According to the present invention, there is provided a method of processing an image signal comprising the steps of setting a window of $n \times n$ picture element matrix (where n is an odd number) with respect to an image signal obtained by scanning an original picture, calculating a correction amount S for a pixel information $a_{mm}$ at a center position of the window by a predetermined formula obtained on the basis of all of the pixel information within the window, obtaining sequentially added values by adding every column of pixel information to the picture elements of respective lines placed on the same column in the window, subtracting from the latest added value the added value before (n+1) times therefrom, supplying the subtracted value to a latch circuit through an adder thereby latching the subtracted value, obtaining added values with respect to the pixel information of all of the picture elements in the window by feeding back the latched values to the adder to sequentially add them to the subtracted values, making the values of the latch circuit correspond to the added values, and obtaining from the added values the correction amount S by the use of the predetermined formula.

There is also provided a method of processing an image signal comprising the steps of setting a window of $n \times n$ picture element matrix (where n is an odd number) with respect to an image signal obtained by scanning an original picture, calculating a correction amount S for pixel information $a_{mm}$ at a center position of the window by a predetermined formula obtained on the basis of all of the pixel information within the window, sequentially and cyclically writing the image signal in P line memories (where $P \geq n+1$, n is an odd number), simultaneously reading pixel information from the line memories to supply them to an adder through respective gate circuits during writing, selectively opening the gate circuits to supply to the adder the pixel information read out from n line memories to supply them to an adder through respective circuits to supply to the adder the pixel information read out from n line memories which are already written and include the latest line memory during writing of the P line memories, thereby setting and changing over the size of window of the matrix, and sequentially obtaining from the adder for every row added values of the pixel information disposed in the same row direction of the matrix corresponding to the desired window size. The added values obtained by the adder are sequentially supplied to and stored in a first shift register. The stored value of the first register stage of the shift register is supplied to a subtractor as a minuend, the stored value of the (n+1)th register stage is selectively derived with respect to the setting of the desired window size and supplied to the subtractor as subtrahend, and the subtracted values obtained from the subtractor are sequentially added to obtain the added values of all of the pixel information for the desired window size. In connection with the setting of the desired window size and at the same time the window size is set, the central pixel information $a_{mm}$ of the window in the pixel information read out from the P line memories are selectively shunted to supply to and store in a second shift register, the stored values of (n+1)/2th register stage of the second shift register are selected and supplied to a multiplier, thereby obtaining a resultant value of the pixel information $a_{mm}$ at the central position of the window set to the desired size multiplied by $n^2$, and obtaining the correction amount S from the resultant value $n^2 a_{mm}$ and the added value of all of the pixel information at the desired size.

There is further provided a method of processing an image signal comprising the steps of setting a window of $n \times n$ picture element matrix (where n is an odd number) with respect to an image signal obtained by scanning an original picture, calculating a correction amount S for pixel information $a_{mm}$ at a center position of the window by a predetermined formula obtained on the basis of all of the pixel information within the window, subtracting pixel information of respective picture elements in the window, subtracting pixel information of respective picture elements in the window by a suitable subtrahend, calculating the correction amount S from added values obtained by applying whole pixel information within the window, converting the correction amount S into a correcting value Sk by multiplying the correction amount S by a correction coefficient k which is determined in accordance with the effect of the subtraction on the correction amount S, and correcting the pixel information by use of the correcting value Sk.

There is still further provided a method of processing an image signal comprising the steps of setting a window of a $n \times n$ picture element matrix (where n is an odd number) with respect to an image signal obtained by scanning an original picture, calculating a correction amount S for pixel information $a_{mm}$ at a center position of the window by a predetermined formula obtained on the basis of all of the pixel information within the window, previously storing in each address of a presettable random access memory in tabular form a value obtained by multiplying an address value of the random access memory by a linear or nonlinear correction coefficient k, supplying the correction amount S as an address signal to the table in the random access memory so as to convert the correction amount S into a correcting value Sk obtained by multiplying the correction amount S by the correction coefficient k, and correcting the pixel information $a_{mm}$ of the picture element at the center position of the window with the use of the correcting values Sk instead of the correction amount S. The correcting value Sk is supplied to an adder-subtractor capable of switching to an addition mode or a subtraction mode to subject the pixel information $a_{mm}$ of the picture element at the center position of the window to an addition or a subtraction process, thereby making the edge portion of the image signal sharp or smooth.

BRIEF DESCRIPTION OF THE DRAWINGS

FIGS. 1, 1A and 1B are portions of an explanatory view showing a construction of a picture scanning and recording apparatus to which the present invention can be applied;

FIGS. 2, 2A and 2B are portions of a block diagram showing one embodiment of a method of processing an image signal;

FIGS. 4, 4A and 4B are portions of an explanatory view explaining the image signal processing method of the present invention for the case of setting a window as a 5×5 picture element matrix;

FIG. 5 is an explanatory view illustrating an operation of the method shown in FIGS. 4A and 4B;

FIG. 6 is a diagram showing a pixel or picture element array within the window of a 5×5 picture element matrix; and FIG. 7 is a waveform chart explaining correction of the central pixel information by the method of the present invention.

DESCRIPTION OF THE PREFERRED EMBODIMENT

Figure 1B:
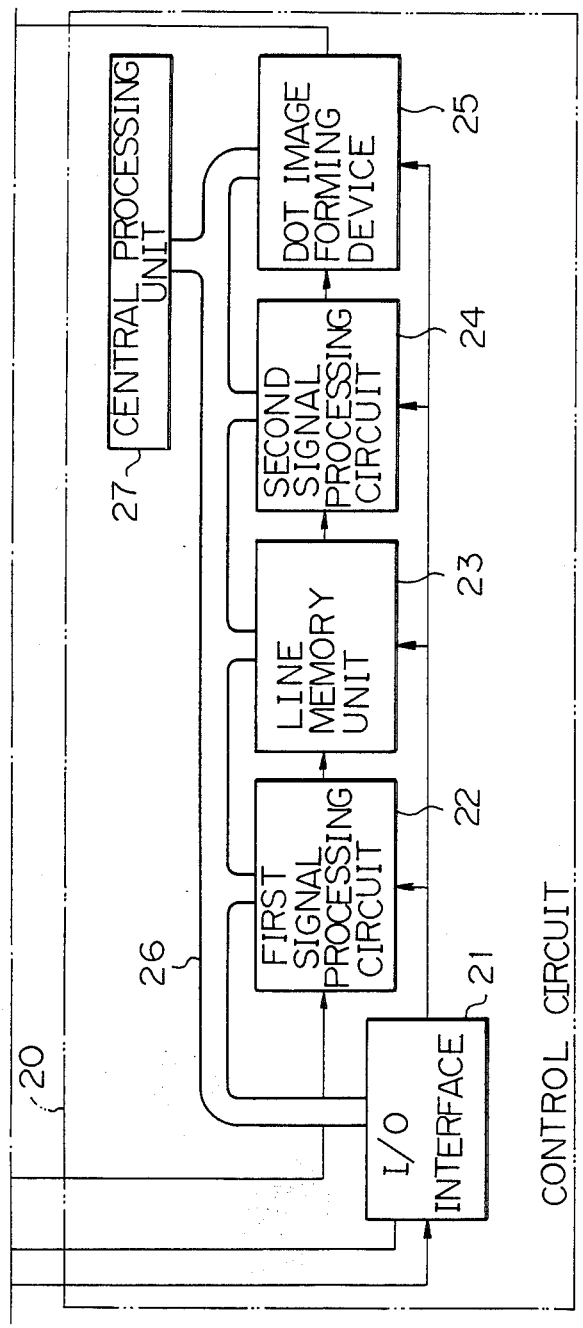

Referring now to the drawings where like reference numerals designate like or functionally equivalent parts, there is shown an embodiment of a method of processing an image signal according to the present invention.

Figure 2A:
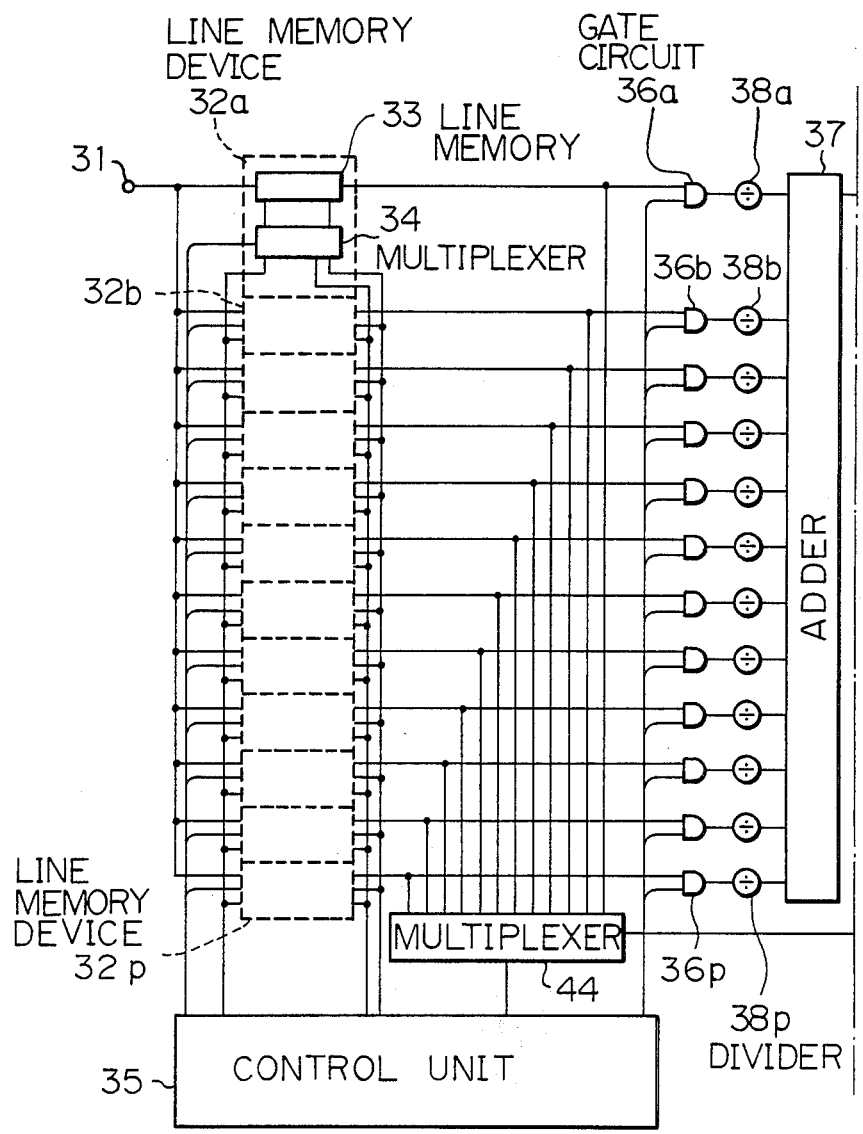

FIG. 2 is a block diagram for explaining an embodiment of the invention and corresponds to the portion of the line memory device 32a–32p and the second signal processing circuit 24 in the image scanning and recording apparatus shown in FIG. 1.

Now, there will be explained the case of setting a window consisting of a picture element matrix of n rows and n columns having a picture element as a subject to be processed with respect to image signals arranged two-dimensionally at the center. Further, in this case, n is an odd number, the column direction corresponds to the main scanning direction and the line direction, and the row direction corresponds to the sub-scanning direction and the number of lines. A signal, obtained by A/D converting, gradation converting or shading processing an image signal obtained by two-dimensionally scanning an image of the manuscript 8 or the like, is supplied to a data signal input terminal 31. The number P of line memory devices 32a–32p comprise a line memory 33 and a multiplexer 34, respectively, and the number P is set to be one unit greater than the maximum line number N in a predetermined maximum window size.

A control unit 35 is controlled by a clock signal generated on the basis of a grating signal. The grating signal controls the line memory devices 32a–32p by each kind of control signals from the control unit 35 such as a write-in/read-out selection signal, a write-in signal, a read-out signal, and the like.

With the use of this control signal, one of the line memory devices 32a–32p which number is at least P (P≧n, n is an odd number) for obtaining a desired maximum window size is circularly and successively used for writing-in, and the remainder are used for reading-out. All of the line memory devices which completed writing-in immediately before the line memory device during writing-in, in the order reverse to the writing order of read-out picture element information of the number n of the line memory devices corresponding to the line number n in the window size to be set, are successively led to an adder at once. Consequently, it is possible to carry out writing-in and read-out of the line memory devices simultaneously and in parallel, so that it becomes possible to carry out these processes in real time.

A number P of gate circuits 36a–36p allow supply of outputs of the n of the line memory devices selectively to the adder 37 in correspondence with the number n of the lines in the desired window size. That is, in these gate circuits 36a–36p, in correspondence with the line number n of the window size, the read-out picture element information of the number n of the line memory devices up to the line memory device written prior to the number n counted backwards from the writing-in order is supplied to the adder 37 from the line memory device which completed writing-in immediately before the line memory device during writing-in, to selectively render n of the gate circuits conductive at once. These gate circuits are controlled by a control signal from the control unit 35.

The picture element information from the n selected line memory devices is added by the adder 37 by every picture element information aligned in the column direction of the picture element matrix of n×n picture element information in the window of the size set by selecting the gate circuits 36a–36p as described above. This addition is successively carried out n times in accordance with the picture elements column in the row (main scanning) direction.

Figure 3:
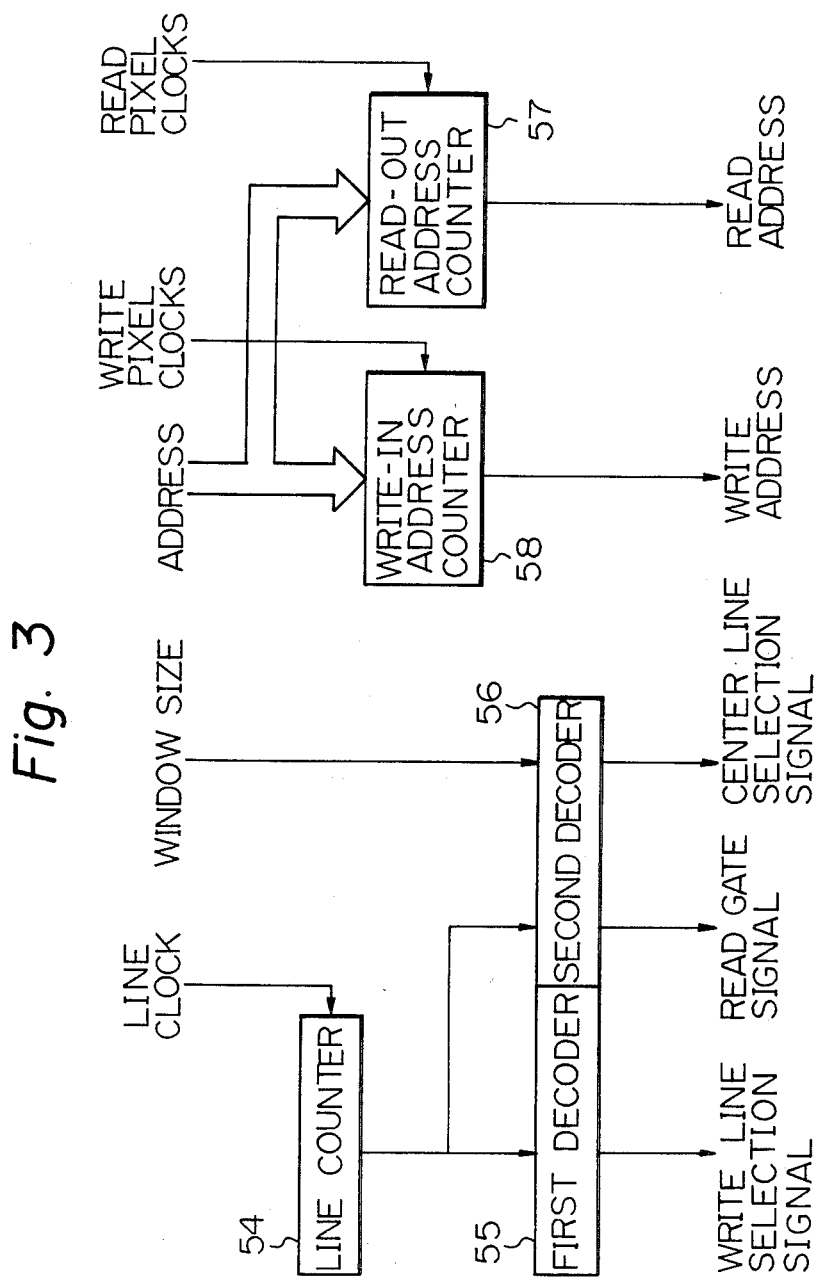
FIG. 3 is a block diagram illustrating a construction of a control section for obtaining various signals for use in the method shown in FIGS. 2A and 2B.

FIG. 3 is a block diagram showing the construction of the essential portion in the control unit 35 for obtaining a write-in line selection signal for selecting the writing-in line memory, a gate signal for selectively and simultaneously opening gate circuits 36a–36p, a central row selection signal for controlling a multiplexer 44 for selectively deriving line memory outputs corresponding to the center row of the window, and a write-in address signal and a read-out address signal for controlling each multiplexer 44 in each line memory device 32a–32p.

Also in FIG. 3, a line counter 54 of P-adic, for example, duodecimal, for counting line block pulses, generates a counted value that is incremented or decremented by one every time one line of a picture image signal is circularly and successively written in the line memory devices 32a–32p. When this counted value is added to a first decoder 55, as illustrated in Table 1 which follows, there is obtained a written-in line selection signal for selecting one of the successive line memory devices 32a–32p as a successive and circular written-in memory.

At the same time, when the counted value of the line counter 54 is added to a second decoder 56 with a window size designating signal, as illustrated in the following Tables 2 to 5, there are obtained a gate signal for selectively and simultaneously opening the n gate circuits corresponding to the designated n×n picture elements of the window size, and a center line selection of the center line in the designated window size in the output of each line memory device led to the gate circuit opened by these gate signals.

In addition, read-out address counter 57 generates a readout address signal and a write-in address counter 58 generates a write-in address signal every time data of one picture element is read out or written in, these read-out and write-in address signals having values which are incremented or decremented by one, and every time the reading-out and writing-in of one line is completed, these counters 57 and 58 are reset to their respective initial values.

The read-out address signal and write-in address signal from the read-out address counter 57 and the write-in address counter 58 are commonly supplied to respective memory devices 32a-32p. For only the line memory devices which are selected by the write-in line selection signals, the incoming image signals are stored in accordance with the write-in address signals, and for the residual line memory devices which are not selected by the write-in line selection signals, the stored values are read-out in accordance with the read-out address signals.

As shown in FIG. 2, dividers 38a-38p are inserted between the adder 37 and respective line memory devices 32a-32p. These dividers 38a-38p divide digitized image information to be inputted to the adder 37 by a suitable divisor so that low order bits of the digitized signals representing image or picture information are removed to as to prevent the added values from being deaffected by fluctuation in the low order bits due to noise.

The outputs of the adder 37 are supplied to a first shift register 39 to successively store every column added value V obtained by adding image information of n picture elements arranged in a line in the subscanning direction within the window by the adder 37. The shift register 39 comprises the number P of registers corresponding to the number of picture elements in the main scanning direction of the window, that is, in this embodiment, $P = 11 + 1 = 12$ registers $V_1$-$V_{12}$, provided that the number N of picture elements in the main scanning direction at the largest window is set to be 11.

Multiplexers 40a-40d select the (n+1)th register which is determined by the window size to be set for the $n \times n$ picture element matrix and derive outputs of the selected register. In this embodiment, these multiplexers 40a-40d are externally selected and operated to selectively read out stored values $v_i$ of the 6th, 8th, 10th, and 12th registers $V_6$, $V_8$, $V_{10}$, and $V_{12}$ corresponding to the setting of $5 \times 5$, $7 \times 7$, $9 \times 9$, and $11 \times 11$ windows. A large number of multiplexers also may be provided in accordance with the window size instead of 4 multiplexers. The stored value $V_i$ of these multiplexers 40a-40d is supplied to a subtractor 41. The multiplexers 40a-40d are selected by the setting of the windows.

While the latest stored value $v_1$ in the first register $V_1$ of the first shift register 39 is supplied to the subtractor 41, thereby subtracting the stored value $V_1$ of the (n+1)th register from the stored value $v_1$, resulting in a calculation of the subtracted value v, the subtracted value v is supplied to an adder 42 to obtain an accumulated and added value for all of the pixel information in the window set to the desired size in real time. That is, the output v of the subtractor 41 is supplied to the adder 42, to which a latched value $\Sigma$ corresponding to the previous accumulated and added value latched by a latch circuit 43 is fed back, so that the subtracted value v and the latched value $\Sigma$ are added to each other in the adder 42, thereby obtaining an added value of all of the pixel information within the window. This added value is latched in the latch circuit 43 as a new latched value $\Sigma$.

A multiplexer 44 is inserted between the line memories 32a-32p and the gate circuits 36a-36p. The multiplexer 44 is controlled by control signals from the control unit 35 and successively derives, in accordance with the shift of picture elements in the line direction within the window, pixel information of the picture element at the center position of the center line within the window ($a_{mm}$) in synchronism with a read-out address signal for each respective one of the line memory devices 32a-32p, and thus the pixel information is supplied to a shift register 45. The shift register 45 comprises at least (p/2+M) registers (where M is the number of latches inserted in the circuit for supplying the correcting value obtained by using the derived pixel information Sk to an adder and subtractor 53 as a correcting value of the pixel information), for example, in this embodiment 9 registers $M_1$-$M_9$.

Multiplexers 46a-46d are selectively operated by an instruction from an external processor in accordance with the size of the window to be set, and are used for selectively deriving outputs of respective registers after the (n+1)/2th register of the shift register 45, in this embodiment the third register from registers $M_3$-$M_6$ in accordance with the setting of a $5 \times 5$, $7 \times 7$, $9 \times 9$, or $11 \times 11$ window. The image information $a_{mm}$ thus derived is information for the central picture element in the window, and is multiplied by $n^2$ in a multiplier 47 by taking $n \times n$ picture elements in the window into consideration for calculating the correction amount S of equation (1) by using the picture information $a_{mm}$ of the central picture element. Then, the output $n^2 \times a_{mm}$ of the multiplier 47 is supplied to a latch circuit 48.

The output signal $\Sigma$ of the latch circuit 43 and the output signal $n^2 \times a_{mm}$ of the latch circut 48 are added in an adder 49 (practically, the operation $n^2 \times a_{mm} - \Sigma$ is performed) to obtain a correction amount S.

The correction amount S is supplied to a resettable random access memory for the table 51 (a "table RAM") through a latch circuit 50 which converts input signals into address signals, and converts the input signals into values corresponding to the address signals. The table RAM 51 converts the correction amount S as an input signal value to a correcting value Sk by multiplying the correction amount S by a correction coefficient k which is linear or nonlinear, and takes into consideration the effect of the subtraction on the correction amount S. To this end, the correction coefficient, set according to a respective correction amount S as an input signal, may be determined by a processor (CPU) 60.

The correction coefficient k is represented in the table RAM 51 as a linear function of S, e.g. $k = b \cdot S$. When the correction value S received in the table RAM 51 from the latch circuit 50 has an absolute value which exceeds a predetermined value M, the value of S is set to be $\pm M$. The symbol b denotes the correction rate or correction factor.

Referring back to FIG. 2B, an operator may view an original picture, and decides what a desirable final image of that picture would be. The operator then enters suitable values for b and M through the keyboard 61, taking the above into account. The operator may enter these values by selecting from a menu displayed on the CRT 62. Then, the CPU 60 presets the correction coefficient k in the table RAM 51.

Thus, when the correction amount S is supplied to the table RAM 51, the correcting value Sk capable of changing in accordance with the amount S with desired characteristics and of compensating for the effect due to the division may be generated in real time, so that generation of the correction value Sk may be performed quickly.

The correcting value Sk from the table RAM 51 is supplied to an adder and subtractor 53 for sharpening or smoothing the edge portion of the picture through a latch circuit 52.

Figure 2B:
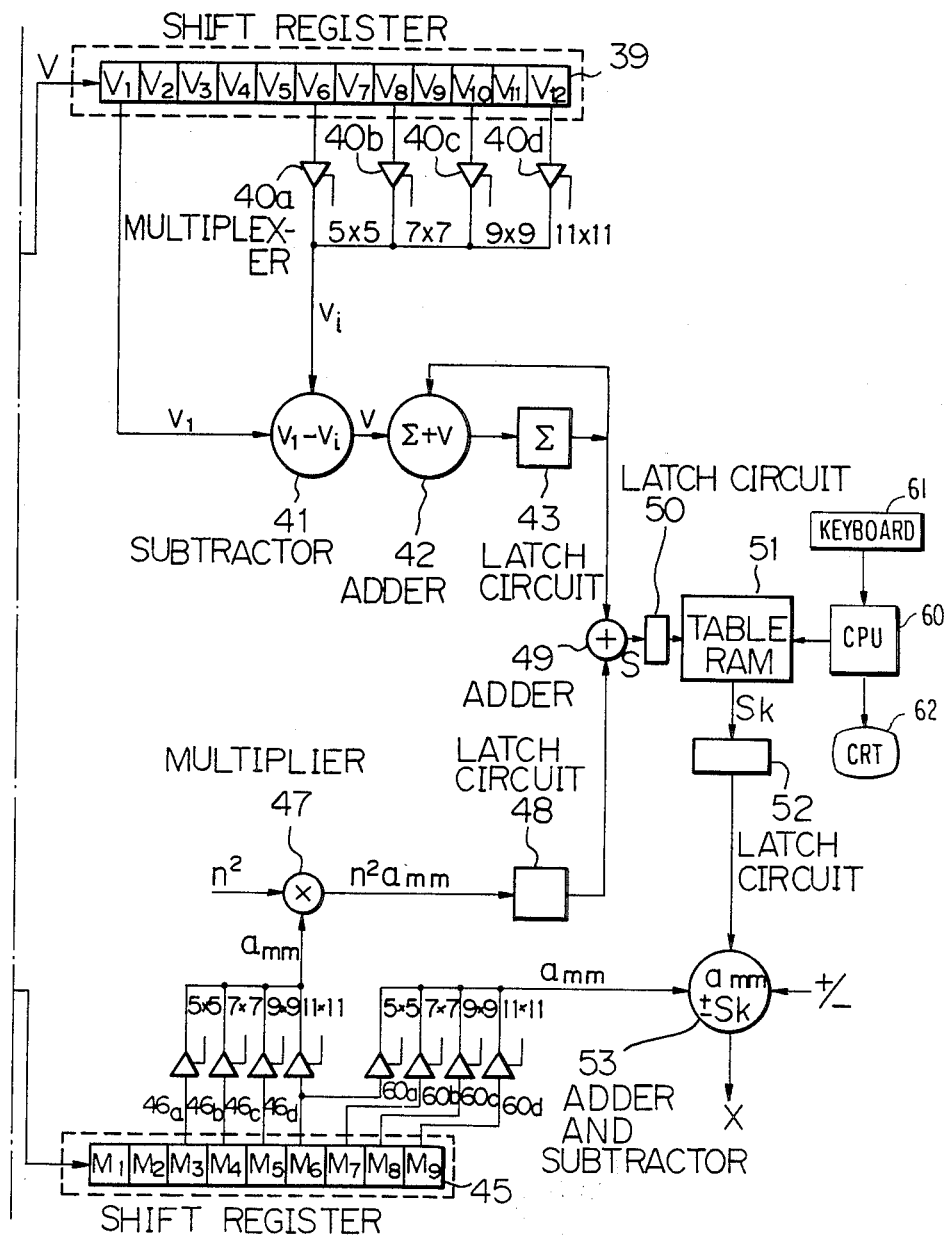

The adder and subtractor 53 also receives the central picture information $a_{mm}$, selected from one of the 6th-9th registers $M_6$-$M_9$ of the shift register 45 having timing coincident with that of the correcting value Sk. In this embodiment, the pixel information $a_{mm}$ at the central window position obtained from the multiplier 47 is latched by three latch circuits 48, 50, and 52 until it arrives at the adder and subtractor 53 to calculate the correcting value so that the pixel information $a_{mm}$ which is to be corrected and supplied to the adder and subtractor 53 must be delayed by the number of latch circuits. The second shift register 45 then comprises (P/2+3) registers, e.g. 9 registers as shown in FIG. 2B, such that the central pixel information $a_{mm}$ in the window can be selectively derived according to the window size. Other multiplexers 60a–60d are also connected to respective registers $M_6$-$M_9$ after the ((n+1)/2+3)th register in accordance with the n×n picture element matrix of the optionally set window size in such a manner that output of the desired register of the registers $M_6$-$M_9$ in which the picture information at the central picture element in the window is stored can be selectively derived by the instruction from the processor (not shown).

The central picture information $a_{mm}$ thus derived is supplied to the adder and subtractor 53 to add it to or subtract it from the correcting value Sk, thereby obtaining image signals for which the picture edge is optionally corrected. In this case, the sharpening or smoothing of the picture may be changed over by an instruction from an external processor, that is, the sharpening or smoothing may be performed by respective addition or subtraction.

The operation of image signal processing in the above embodiment will be explained in detail with reference to FIGS. 4 to 7.

Figure 4B:
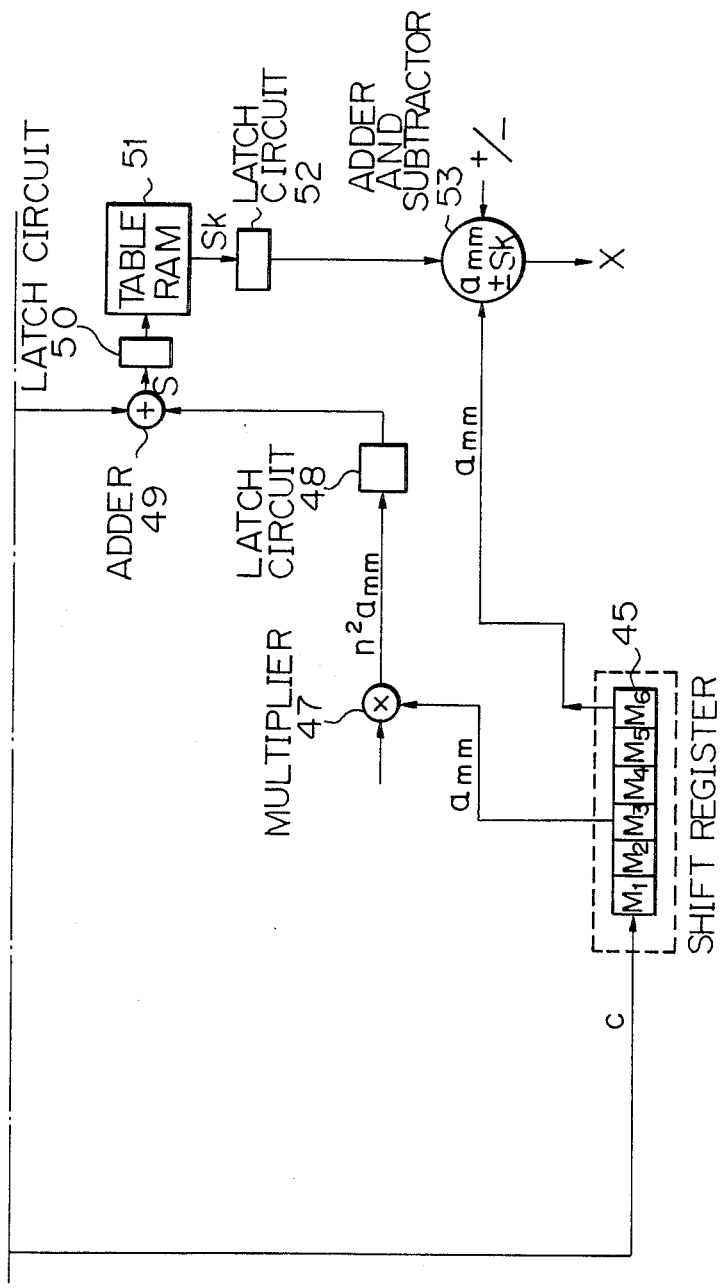

FIG. 4 is an explanatory view describing an embodiment in which a 5×5 picture element matrix window is set. The picture element array in the window is shown in FIG. 6.

In this embodiment, for convenience, the lines from the line memory device during writing-in have been omitted, the first and second shift registers 39 and 45 comprise six registers in accordance with the size of the set window for the picture element matrix and the multiplexer for changing over the window also is omitted. The other construction is similar to that shown in FIG. 2, so that the detailed explanation thereof is omitted.

In this embodiment, signals for five lines are shown by a, b, c, d, and e, and the central picture information is defined as c. This information c is supplied to the second shift register 45.

FIG. 5 shows the holding state of the stored value $v_i$ at respective registers of the first shift register 39, the holding state of the central picture information c at respective registers of the second shift register 45, and the content of latched values Σ at the latch circuit 43 for the stored value $v_i$ and central picture information c.

As shown in FIG. 5, when the first value added by the adder 37 is stored in the first register $V_1$ of the first shift register 39 as a stored value $v_1$, the picture information $c_1$ of the third line is stored in the first register $M_1$ of the second shift register 45. At the same time, the second added value from the adder 37 is stored in the first register $V_1$ as a stored value $v_2$; then, the first stored value $v_1$ is shifted to a second register $V_2$. In the same way, the stored $c_1$ of the first register $M_1$ in the second shift register 45 also is shifted to the next register $M_2$ so that the next central picture information to the third line is stored in the register $M_1$, thereby becoming the latch value Σ being $v_1$. Similarly, added values are successively stored, and when the sixth added value is stored in the register $V_1$ as a stored value $v_6$, all registers of both shift registers 39 and 45 memorize stored values. Then, the latched values Σ also designate the correct value, and arrive at the steady state so that the correction amount S can be obtained in only five shift operations.

Moreover, as described above, the correction amount S is converted at once into a linear or nonlinear correcting value Sk by the table RAM 51 so that the operational speed for emphasizing or smoothing the edge portion of the picture to obtain the desired sharpness may be substantially increased as compared with the conventional image signal processing method.

For example, when the picture information for picture elements in a window for an original picture image are arranged as shown in FIG. 6, the picture information of the picture element at the center of the window is $a_{33}$, so that the adder 37 supplies the added value v as the added values $(a_{11}+a_{21}+a_{31}+a_{41}+a_{51})$ or $(a_{12}+a_{22}+a_{32}+a_{42}+a_{52})$ every picture information placed in the vertical direction to the first shift register 39, successively. In this case, the correcting value Sk is shown by the following equation (2):

$$Sk = k(25a_{33} - (a_{11}+a_{12}+\ldots+a_{15}+a_{21}+\ldots+a_{55})) \quad (2)$$

Then, the corrected picture information X is represented by the following equation (3), and is corrected as shown in FIG. 7:

$$X = a_{33} + Sk \quad (3)$$

FIGS. 7A to 7E shown waveforms for explaining the progress of the above described correction. FIG. 7A shows an image or picture or picture signal $a_{mm}$ having an edge portion to be corrected. FIG. 7B designates the correcting value Sk obtained by multiplying the correction amount S for the image signal $a_{mm}$ by the correction coefficient k (in this case, $k \leq 1$). When the correcting value Sk is added to the picture information $a_{mm}$ shown in FIG. 7A with positive polarity, the waveform having a sharp edge portion can be obtained as shown in FIG. 7D. When the correcting value Sk shown in FIG. 7C is added to the image signal $a_{mm}$ shown in FIG. 7A with negative polarity, the waveform having a smooth edge portion can be obtained as shown in FIG. 7E.

Therefore, when such a corrected digitized image signal is added to the dot image picture forming device 25 including a D/A converter of the picture scanning and recording apparatus as explained with reference to FIG. 1 to form dot image signals and the signals thus obtained are supplied to the driver circuit 16 for the optical modulator 3 to modulate s-polarized light from the laser light source 1, the picture signal corrected with the desired sharpness can be recorded by a recording device.

When a particular correcting value Sk to be present for the table RAM 51 is calculated, the correction coefficient k to be multiplied with the correction amount S may easily and speedily be changed by an external processor. In this case, the correction coefficient k may selectively be utilized as a linear or nonlinear value in accordance with the property of the original picture.

It is further understood by those skilled in the art that the foregoing description is a preferred embodiment of the disclosed device; the present invention is not limited thereto, and various changes and modifications may be made in the present invention without departing from the spirit and scope thereof. In particular, the image processing device to which the present invention may be applied is not limited to that shown in FIG. 1.

TABLE 1

| Output of line counter | Write line memory |
|---|---|
| 0 0 0 0 | 1 st line memory |
| 0 0 0 1 | 2 nd line memory |
| 0 0 1 0 | 3 rd line memory |
| 0 0 1 1 | 4 th line memory |
| 0 1 0 0 | 5 th line memory |

TABLE 1-continued

| Output of line counter | Write line memory |
|---|---|
| 0 1 0 1 | 6 th line memory |
| 0 1 1 0 | 7 th line memory |
| 0 1 1 1 | 8 th line memory |
| 1 0 0 0 | 9 th line memory |
| 1 0 0 1 | 10 th line memory |
| 1 0 1 0 | 11 th line memory |
| 1 0 1 1 | 12 th line memory |
| 0 0 0 0 | 1 st line memory |
| 0 0 0 1 | 2 nd line memory |
| . | . |
| . | . |
| . | . |

TABLE 2

| Window size n × n | Value of line counter | Gate signal (The number of gate circuit) | | | | | | | | | | | | Line memory number of central line | Remarks |
|---|---|---|---|---|---|---|---|---|---|---|---|---|---|---|---|
| | | 1 | 2 | 3 | 4 | 5 | 6 | 7 | 8 | 9 | 10 | 11 | 12 | | |
| 5 × 5 | 0000 | 0 | 1 | 1 | 1 | 1 | 1 | 0 | 0 | 0 | 0 | 0 | 0 | 4 | Operating |
| | 0001 | 1 | 1 | 1 | 1 | 1 | 0 | 0 | 0 | 0 | 0 | 0 | 0 | 3 | direction |
| | 0010 | 1 | 1 | 1 | 1 | 0 | 0 | 0 | 0 | 0 | 0 | 0 | 1 | 2 | of line |
| | 0011 | 1 | 1 | 1 | 0 | 0 | 0 | 0 | 0 | 0 | 0 | 1 | 1 | 1 | counter |
| | 0100 | 1 | 1 | 0 | 0 | 0 | 0 | 0 | 0 | 0 | 1 | 1 | 1 | 12 | ↓ |
| | 0101 | 1 | 0 | 0 | 0 | 0 | 0 | 0 | 0 | 1 | 1 | 1 | 1 | 11 | ↓ |
| | 0110 | 0 | 0 | 0 | 0 | 0 | 0 | 0 | 1 | 1 | 1 | 1 | 1 | 10 | ↓ |
| | 0111 | 0 | 0 | 0 | 0 | 0 | 0 | 1 | 1 | 1 | 1 | 1 | 0 | 9 | ↓ |
| | 1000 | 0 | 0 | 0 | 0 | 0 | 1 | 1 | 1 | 1 | 1 | 0 | 0 | 8 | ↓ |
| | 1001 | 0 | 0 | 0 | 0 | 1 | 1 | 1 | 1 | 1 | 0 | 0 | 0 | 7 | ↓ |
| | 1010 | 0 | 0 | 0 | 1 | 1 | 1 | 1 | 1 | 0 | 0 | 0 | 0 | 6 | ↓ |
| | 1011 | 0 | 0 | 1 | 1 | 1 | 1 | 1 | 0 | 0 | 0 | 0 | 0 | 5 | ↓ |

TABLE 3

| window size n × n | Value of line counter | Gate signal (The number of gate circuit) | | | | | | | | | | | | Line memory number of central line | Remarks |
|---|---|---|---|---|---|---|---|---|---|---|---|---|---|---|---|
| | | 1 | 2 | 3 | 4 | 5 | 6 | 7 | 8 | 9 | 10 | 11 | 12 | | |
| 7 × 7 | 0000 | 0 | 1 | 1 | 1 | 1 | 1 | 1 | 1 | 0 | 0 | 0 | 0 | 5 | Operating |
| | 0001 | 1 | 1 | 1 | 1 | 1 | 1 | 1 | 0 | 0 | 0 | 0 | 0 | 4 | direction |
| | 0010 | 1 | 1 | 1 | 1 | 1 | 1 | 0 | 0 | 0 | 0 | 0 | 1 | 3 | of line |
| | 0011 | 1 | 1 | 1 | 1 | 1 | 0 | 0 | 0 | 0 | 0 | 1 | 1 | 2 | counter |
| | 0100 | 1 | 1 | 1 | 1 | 0 | 0 | 0 | 0 | 0 | 1 | 1 | 1 | 1 | ↓ |
| | 0101 | 1 | 1 | 1 | 0 | 0 | 0 | 0 | 0 | 1 | 1 | 1 | 1 | 12 | ↓ |
| | 0110 | 1 | 1 | 0 | 0 | 0 | 0 | 0 | 1 | 1 | 1 | 1 | 1 | 11 | ↓ |
| | 0111 | 1 | 0 | 0 | 0 | 0 | 0 | 1 | 1 | 1 | 1 | 1 | 1 | 10 | ↓ |
| | 1000 | 0 | 0 | 0 | 0 | 0 | 1 | 1 | 1 | 1 | 1 | 1 | 1 | 9 | ↓ |
| | 1001 | 0 | 0 | 0 | 0 | 1 | 1 | 1 | 1 | 1 | 1 | 1 | 0 | 8 | ↓ |
| | 1010 | 0 | 0 | 0 | 1 | 1 | 1 | 1 | 1 | 1 | 1 | 0 | 0 | 7 | ↓ |
| | 1011 | 0 | 0 | 1 | 1 | 1 | 1 | 1 | 1 | 1 | 0 | 0 | 0 | 6 | ↓ |

TABLE 4

| Window size n × n | Value of line counter | Gate signal (The number of gate circuit) | | | | | | | | | | | | Line memory number of central line | Remarks |
|---|---|---|---|---|---|---|---|---|---|---|---|---|---|---|---|
| | | 1 | 2 | 3 | 4 | 5 | 6 | 7 | 8 | 9 | 10 | 11 | 12 | | |
| 9 × 9 | 0000 | 0 | 1 | 1 | 1 | 1 | 1 | 1 | 1 | 1 | 1 | 0 | 0 | 6 | Operating |
| | 0001 | 1 | 1 | 1 | 1 | 1 | 1 | 1 | 1 | 1 | 0 | 0 | 0 | 5 | direction |
| | 0010 | 1 | 1 | 1 | 1 | 1 | 1 | 1 | 1 | 0 | 0 | 0 | 1 | 4 | of line |
| | 0011 | 1 | 1 | 1 | 1 | 1 | 1 | 1 | 0 | 0 | 0 | 1 | 1 | 3 | counter |
| | 0100 | 1 | 1 | 1 | 1 | 1 | 1 | 0 | 0 | 0 | 1 | 1 | 1 | 2 | ↓ |
| | 0101 | 1 | 1 | 1 | 1 | 1 | 0 | 0 | 0 | 1 | 1 | 1 | 1 | 1 | ↓ |
| | 0110 | 1 | 1 | 1 | 1 | 0 | 0 | 0 | 1 | 1 | 1 | 1 | 1 | 12 | ↓ |
| | 0111 | 1 | 1 | 1 | 0 | 0 | 0 | 1 | 1 | 1 | 1 | 1 | 1 | 11 | ↓ |
| | 1000 | 1 | 1 | 0 | 0 | 0 | 1 | 1 | 1 | 1 | 1 | 1 | 1 | 10 | ↓ |
| | 1001 | 1 | 0 | 0 | 0 | 1 | 1 | 1 | 1 | 1 | 1 | 1 | 1 | 9 | ↓ |
| | 1010 | 0 | 0 | 0 | 1 | 1 | 1 | 1 | 1 | 1 | 1 | 1 | 1 | 8 | ↓ |
| | 1011 | 0 | 0 | 1 | 1 | 1 | 1 | 1 | 1 | 1 | 1 | 1 | 0 | 7 | ↓ |

TABLE 5

| Window size n × n | Value of line counter | Gate signal (The number of gate circuit) | | | | | | | | | | | | Line memory number of central line | Remarks |
|---|---|---|---|---|---|---|---|---|---|---|---|---|---|---|---|
| | | 1 | 2 | 3 | 4 | 5 | 6 | 7 | 8 | 9 | 10 | 11 | 12 | | |
| | 0000 | 0 | 1 | 1 | 1 | 1 | 1 | 1 | 1 | 1 | 1 | 1 | 1 | 7 | Operating |
| | 0001 | 1 | 1 | 1 | 1 | 1 | 1 | 1 | 1 | 1 | 1 | 1 | 0 | 6 | direction |

TABLE 5-continued

| Window size n × n | Value of line counter | Gate signal (The number of gate circuit) | | | | | | | | | | | | Line memory number of central line | Remarks |
|---|---|---|---|---|---|---|---|---|---|---|---|---|---|---|---|
| | | 1 | 2 | 3 | 4 | 5 | 6 | 7 | 8 | 9 | 10 | 11 | 12 | | |
| | 0010 | 1 | 1 | 1 | 1 | 1 | 1 | 1 | 1 | 1 | 1 | 0 | 1 | 5 | of line |
| | 0011 | 1 | 1 | 1 | 1 | 1 | 1 | 1 | 1 | 1 | 0 | 1 | 1 | 4 | counter |
| | 0100 | 1 | 1 | 1 | 1 | 1 | 1 | 1 | 1 | 0 | 1 | 1 | 1 | 3 | ↓ |
| 11 × 11 | 0101 | 1 | 1 | 1 | 1 | 1 | 1 | 1 | 0 | 1 | 1 | 1 | 1 | 2 | ↓ |
| | 0110 | 1 | 1 | 1 | 1 | 1 | 1 | 0 | 1 | 1 | 1 | 1 | 1 | 1 | ↓ |
| | 0111 | 1 | 1 | 1 | 1 | 1 | 0 | 1 | 1 | 1 | 1 | 1 | 1 | 12 | ↓ |
| | 1000 | 1 | 1 | 1 | 1 | 0 | 1 | 1 | 1 | 1 | 1 | 1 | 1 | 11 | ↓ |
| | 1001 | 1 | 1 | 1 | 0 | 1 | 1 | 1 | 1 | 1 | 1 | 1 | 1 | 10 | ↓ |
| | 1010 | 1 | 1 | 0 | 1 | 1 | 1 | 1 | 1 | 1 | 1 | 1 | 1 | 9 | ↓ |
| | 1011 | 1 | 0 | 1 | 1 | 1 | 1 | 1 | 1 | 1 | 1 | 1 | 1 | 8 | ↓ |

What is claimed is:

1. In a method of processing an image signal, said method having the steps of setting an n×n picture element matrix window (where n is an odd number) with respect to an image signal obtained by scanning an original picture, said picture element matrix window containing a plurality of picture elements arranged in rows and columns, each of said picture elements in turn containing pixel information; calculating a correction amount S for pixel information $a_{mm}$ at a center position of said window by a predetermined formula obtained in accordance with all of the pixel information within said window; and correcting said pixel information $a_{mm}$ of the central picture element in the window in accordance with said correction amount S, the improvement comprising the steps of obtaining sequential added values by adding each of said columns of pixel information to the picture elements of respective lines placed on the same column in the window; subtracting from the latest added value the added value before (n+1) times therefrom to obtain a subtracted value; supplying the subtracted value to a latch circuit through an adder, thereby latching the subtracted value; obtaining added values with respect to the pixel information of all of the picture elements in the window by feeding back the latched values to the adder to sequentially add them to the subtracted values; making the latched values of the latch circuit correspond to the added values; and obtaining from the added values the correction amount S in accordance with said formula.

2. A method of processing an image signal as claimed in claim 1, wherein the correction amount S to the picture information at the central position within the window is obtained by the following formula:

$$S = n^2 a_{mm} - (a_{11} + a_{12} \ldots + a_{1n} + a_{21} + \ldots + a_{nn})$$

where
$m = (n+1)/2$
$a_{mm}$ = pixel information at the central picture element
$a_{11} - a_{nn}$ = pixel information of each picture element within the window.

3. In a method of processing an image, said method having the steps of setting an n×n picture element matrix window (where n is an odd number) with respect to an image signal obtained by scanning an original picture, said picture element matrix window containing a plurality of picture elements arranged in rows and columns, each of said picture elements in turn containing pixel information; calculating a correction amount S for pixel information $a_{mm}$ at a center position of said window by a predetermined formula obtained in accordance with all of the pixel information within said window; and correcting said pixel information $a_{mm}$ of the central picture element in the window in accordance with said correction amount S, the improvement comprising the steps of sequentially and cyclically writing the image signal in P line memories (where P≧n+1, n is an odd number); simultaneously reading the pixel information from the line memories and supplying the pixel information in order to an adder through respective gate circuits during writing; selectively opening the gate circuits to supply to the adder the pixel information read out from n of the line memories which are already written and include the latest line memory during writing of the P line memories, so as to permit selection of the desired size of the window of the matrix; and sequentially obtaining from the adder every row added values of the pixel information disposed in the same row direction of the matrix corresponding to the desired window size.

4. A method of processing an image signal as claimed in claim 3, wherein the added values obtained by the adder are sequentially supplied to and stored in a first shift register, the stored value of the first register stage of the first shift register is supplied to a subtractor as a minuend, the stored value of a (n+1)th register is selectively derived with respect to the setting of the desired window size to the subtractor as a subtrahend, and subtracted values so obtained from the subtractor are sequentially added to obtain the added values of all of the pixel information for the desired window size.

5. A method of processing an image signal as claimed in claim 3, wherein in connection with the setting of the desired window size, and at the same time that the window size is set, the central pixel information $a_{mm}$ of the window in the pixel information read out from the P line memories are selectively shunted to supply to and store in a second shift register, the stored values of a ((n+1)/2)th register stage of the second shift register are selected and supplied to a multiplier, thereby obtaining a resultant value of the pixel information $a_{mm}$ at the central position of the window set to the desired size multiplied by $n^2$, and the correction amount S is obtained from the resultant value $n^2 a_{mm}$ and the added value of all of the pixel information at the desired window size.

6. A method of processing an image signal as claimed in claim 3, wherein the correction amount S to the image information at the central position within the window is obtained by the following formula:

$$S = n^2 a_{mm} - (a_{11} + a_{12} \ldots + a_{1n} + a_{21} + \ldots + a_{nn})$$

where m=(n+1)/2

$a_{mm}$ is pixel information at the central picture element $a_{11}-a_{nn}$ are pixel information of each picture element within the window.

7. In a method of processing an image, said method having the steps of setting n×n picture element matrix window (where n is an odd number) with respect to an image signal obtained by scanning an original picture, said picture element matrix window containing a plurality of picture elements arranged in rows and columns, each of said picture elements in turn containing pixel information; calculating a correction amount S for pixel information $a_{mm}$ at a center position of said window by a predetermined formula obtained in accordance with all of the pixel information within said window; and correcting said pixel information $a_{mm}$ of the central picture element in the window in accordance with said correction amount S, the improvement comprising the steps of dividing pixel information of respective picture elements in the window by a suitable subtrahend; calculating the correction amount S from added values obtained by adding all of the pixel information within the window; converting the correction amount S into a correcting value Sk by multiplying the correction amount S by a correction coefficient k which is selectable by a user, the coefficient k having also taken into consideration the effect of the subtraction on the correction amount S; and correcting the pixel information in accordance with the correcting value Sk.

8. A method of processing an image signal as claimed in claim 7, wherein the correction amount S to the image information at the central position within the window is obtained by the following formula:

$$S = n^2 a_{mm} - (a_{11} + a_{12} \ldots + a_{1n} + a_{21} + \ldots + a_{nn})$$

where
m=(n+1)/2

$a_{mm}$ is pixel information at the central picture element $a_{11}-a_{nn}$ are pixel information of each picture element within the window.

9. A method of processing an image signal as claimed in claim 7, wherein the correcting value Sk is obtained by the following formula:

$$Sk = k(25a_{33} - (a_{11} + a_{12} + \ldots + a_{15} + a_{21} + \ldots + a_{55}))$$

where k is the correction coefficient.

10. In a method of processing an image, said method having the steps of setting n×n picture element matrix window (where n is an odd number) with respect to an image signal obtained by scanning an original picture, said picture element matrix window containing a plurality of picture elements arranged in rows and columns, each of said picture elements in turn containing pixel information; calculating a correction amount S for pixel information $a_{mm}$ at a center position of said window by a predetermined formula obtained in accordance with all of the pixel information within said window; and correcting said pixel information $a_{mm}$ of the central picture element in the window in accordance with said correction amount S, the improvement comprising the steps of previously storing, in each address of a presettable random access memory containing a table, a value obtained by multiplying an address value of the random access memory by a linear or nonlinear correction coefficient k; supplying the correction amount S as an address signal to the table in the random access memory so as to convert the correction amount S into a correcting value Sk obtained by multiplying the correction amount S by the correction coefficient k; and correcting the pixel information $a_{mm}$ of the picture element at the center position of the window in accordance with the correcting value Sk instead of the correction amount S.

11. A method of processing an image signal as claimed in claim 10, wherein the correcting value Sk is supplied to an adder-subtractor capable of switching to an addition or a subtraction mode to subject the pixel information $a_{mm}$ of the picture element at the center position of the window to an addition or a subtraction process, thereby rendering an edge portion of the image signal sharp or smooth.

12. A method of processing an image signal as claimed in claim 10, wherein the correction amount S to the image information at the central position within the window is obtained by the following formula:

$$S = n^2 a_{mm} - (a_{11} + a_{12} \ldots + a_{1n} + a_{21} + \ldots + a_{nn})$$

where
m=(n+1)/2

$a_{mm}$ is pixel information at the central picture element $a_{11}-a_{nn}$ are pixel information of each picture element within the window.

13. A method of processing an image signal as claimed in claim 10, wherein the correcting value Sk is obtained by the following formula:

$$Sk = k(25a_{33} - (a_{11} + a_{12} + \ldots + a_{15} + a_{21} + \ldots + a_{55}))$$

where k is the correction coefficient.

* * * * *